(12) United States Patent
Kim

(10) Patent No.: US 11,396,963 B2
(45) Date of Patent: Jul. 26, 2022

(54) DEVICE FOR MAKING PLUMBING CONNECTIONS AND A METHOD OF USE THEREOF

(71) Applicant: Brian B. Kim, Denton, TX (US)

(72) Inventor: Brian B. Kim, Denton, TX (US)

(73) Assignee: Brian B. Scott, Flower Mound, TX (US)

( * ) Notice: Subject to any disclaimer, the term of this patent is extended or adjusted under 35 U.S.C. 154(b) by 236 days.

(21) Appl. No.: 15/979,975

(22) Filed: May 15, 2018

(65) Prior Publication Data

US 2019/0360618 A1 Nov. 28, 2019

Related U.S. Application Data

(60) Provisional application No. 62/623,254, filed on Jan. 29, 2018.

(51) Int. Cl.
*F16L 19/10* (2006.01)
*F16L 19/065* (2006.01)

(52) U.S. Cl.
CPC ............ *F16L 19/10* (2013.01); *F16L 19/065* (2013.01)

(58) Field of Classification Search
CPC ......... F16L 19/10; F16L 19/06; F16L 19/065; F16L 19/0653; F16L 25/14; F16L 47/04; F16L 47/265; F16L 19/048; F16L 19/062
USPC .................................... 285/341, 148.23, 324
See application file for complete search history.

(56) References Cited

U.S. PATENT DOCUMENTS

| 1,030,237 | A | * | 6/1912 | Hall | ................... F16L 19/10 |
| 2,233,214 | A | * | 2/1941 | Lamont | ............... F16L 19/0653 285/341 |
| 3,056,617 | A | * | 10/1962 | Snoddy | ................... 285/341 |
| 3,265,414 | A | * | 8/1966 | Reid | ................... F16L 19/065 |
| 6,027,294 | A | | 2/2000 | Newby | |

(Continued)

FOREIGN PATENT DOCUMENTS

| DE | 8715620 | 4/1988 |
| EP | 2843284 | 3/2015 |

(Continued)

OTHER PUBLICATIONS

HSME Valves and Fittings, pp. 12, 15, and 34 (Year: 2015).*

(Continued)

*Primary Examiner* — Zachary T Dragicevich
(74) *Attorney, Agent, or Firm* — Sul Lee Law Firm PLLC

(57) ABSTRACT

A device for making plumbing connections is provided. The device includes a first compression nut, a second compression nut, a sleeve fitting body between the first compression nut and the second compression nut, a first ferrule between the first compression nut and the sleeve fitting body, and a second ferrule between the sleeve fitting body and the second compression nut. The first compression nut has a first narrow portion and a first threaded portion, the first narrow portion having a first internal cavity with a first diameter. The second compression nut has a second narrow portion and a second threaded portion, the second narrow portion having a second internal cavity with a second diameter. The sleeve fitting body has a threaded portion that respectively correspond to the first and second threaded portions, and a first cavity portion having the first diameter, and a second cavity portion having the second diameter.

3 Claims, 15 Drawing Sheets

(56) References Cited

U.S. PATENT DOCUMENTS

| | | | | |
|---|---|---|---|---|
| 9,470,347 | B1 * | 10/2016 | Peirce | F16L 19/10 |
| 9,787,070 | B2 * | 10/2017 | DeCesare | |
| 2006/0138771 | A1 * | 6/2006 | Galante | F16L 19/065 |
| 2009/0230678 | A1 * | 9/2009 | Krohn | F16L 25/14 |
| 2013/0181445 | A1 | 7/2013 | Glime et al. | |
| 2016/0091126 | A1 * | 3/2016 | Gibson | F16L 19/10 |

FOREIGN PATENT DOCUMENTS

| | | | | |
|---|---|---|---|---|
| FR | 2171506 | | 9/1973 | |
| FR | 2600399 | A1 * | 12/1987 | F16L 25/14 |
| NL | 7314624 | | 4/1975 | |

OTHER PUBLICATIONS

Valco Fittings, https://web.archive.org/web/20160801180019/https://www.vici.com/ft_intro/fi_val3.php (Year: 2016).*

* cited by examiner

520

530

540

DEVICE FOR MAKING PLUMBING CONNECTIONS AND A METHOD OF USE THEREOF

CROSS-REFERENCE TO RELATED APPLICATIONS

This present application claims benefit of U.S. Provisional Application No. 62/623,254 filed Jan. 29, 2018, the content of which is hereby incorporated by reference in its entirety.

TECHNICAL FIELD

The present disclosure relates generally to tube fittings in plumbing and more specifically to a device for connecting tubes and a method of use thereof.

BACKGROUND ART

A tube in plumbing may be connected with a valve in order to receive from or supply a fluid through the valve or may be connected with another tube to extend the overall length of the plumbing. A typical method of making such an assembly involves inserting a tube or pipe into another tube or pipe that is widened at the free end to receive the pipe.

FIG. 1A illustrates a series of visual steps illustrating a process 100 for connecting a fitting body 102 with a tube 106 according to a prior art. As shown in FIG. 1A, the setup involves the fitting body 102 including a tubular arm 104. The tubular arm 104 has a widened portion 1044 that has a first free end 1042. The tube 106 is to be connected with the tubular arm 104 and is adapted to be received through the first free end 1042 of the widened portion 1044 of the tubular arm 104. The connecting process 100 begins at step 110, when a first end 1062 of the tube 106 is inserted through the first free end 1042 and into the widened portion 1044 of the tubular arm 104 as shown in FIG. 1A. The diameter at the first free end 1042 of the tubular arm 104 being wider than the diameter of the tube 106 helps to easily accommodate the tube 106 within the widened portion 1044 of the tubular arm 104.

At step 120, the tube 106 is securely connected to the tubular arm 104 using a joining or fusion technique such as welding 108. A welded joint 1082 is more clearly shown in the sectional view shown in FIG. 1B. Welding 108 is done so as to secure the connection and prevent any relative motion of the joining parts as well as increasing the strength of the joint.

But there are numerous problems with the prior art connecting process 100. For example, the process 100 uses welding which has number of issues, the first being the need for expertise to perform welding. If welding is not done properly, then there is risk of permanent damage to the pipes or tube that is being welded. Also, a secure environment is needed for welding as there is always risk of fire. Moreover, this process is time consuming and requires specific tools.

In light of the discussion above, there is clearly a need in the art for connecting tubes that is simple, time saving and cost effective and does not suffer from the above mention problems.

SUMMARY

The present disclosure is directed to providing an improved technique for connecting tubes that is efficient in cost and time.

According to an embodiment a connection apparatus includes a first compression nut having a first narrow portion and a first threaded portion, the first narrow portion having a first internal cavity with a first diameter; a second compression nut comprising a second narrow portion and a second threaded portion, the second narrow portion having a second internal cavity with a second diameter; a sleeve fitting body having threaded portions that respectively correspond to the first and second threaded portions, a first cavity portion having the first diameter, and a second cavity portion having the second diameter; a first ferrule between the first compression nut and the sleeve fitting body; and a second ferrule between the sleeve fitting body and the second compression nut.

In accordance with an embodiment, a connection apparatus includes a first compression nut having a first narrow portion and a first threaded portion, the first narrow portion having a first internal cavity with a first diameter; a second compression nut having a second narrow portion and a second threaded portion, the second narrow portion having a second internal cavity with a second diameter; a sleeve fitting body, between the first compression nut and the second compression nut, having a third threaded portion corresponding to the first threaded portion, a fourth threaded portion corresponding to the second threaded portion, an inner cylindrical portion extending toward the first compression nut to form a first end-facing inner cavity portion having a third diameter and a first end-facing ring-shaped cavity having the first diameter, the first end-facing ring-shaped cavity portion facing the compression nut and comprising a gap between an outer wall of the inner cylindrical portion and an inner wall of the sleeve fitting body, and a second end-facing cavity portion having the second diameter; a first ferrule between the first compression nut and the sleeve fitting body; and a second ferrule between the sleeve fitting body and the second compression nut.

According to an embodiment, the first compression nut includes an end portion having a fifth threaded portion and a portion of the first narrow portion, and an engaging portion having a sixth threaded portion corresponding to the fifth threaded portion and the remaining portion of the first narrow portion.

According to an embodiment, the connection apparatus further includes a ring between the end portion and the engaging portion.

BRIEF DESCRIPTION OF THE ACCOMPANYING DRAWINGS

So that the manner in which the above recited features of the present disclosure can be understood in detail, a more particular description of the disclosure, briefly summarized above, may have been referred by embodiments, some of which are illustrated in the appended drawings. It is to be noted, however, that the appended drawings illustrate only some embodiments of this disclosure and are therefore not to be considered as limiting of its scope, which extends to other equally effective embodiments that are in the same spirit of the invention.

These and other features, benefits, and advantages of the present disclosure will become apparent by reference to the following text and drawings, with like reference numbers referring to like structures across the figures, wherein.

DETAILED DESCRIPTION

Figure 1A:
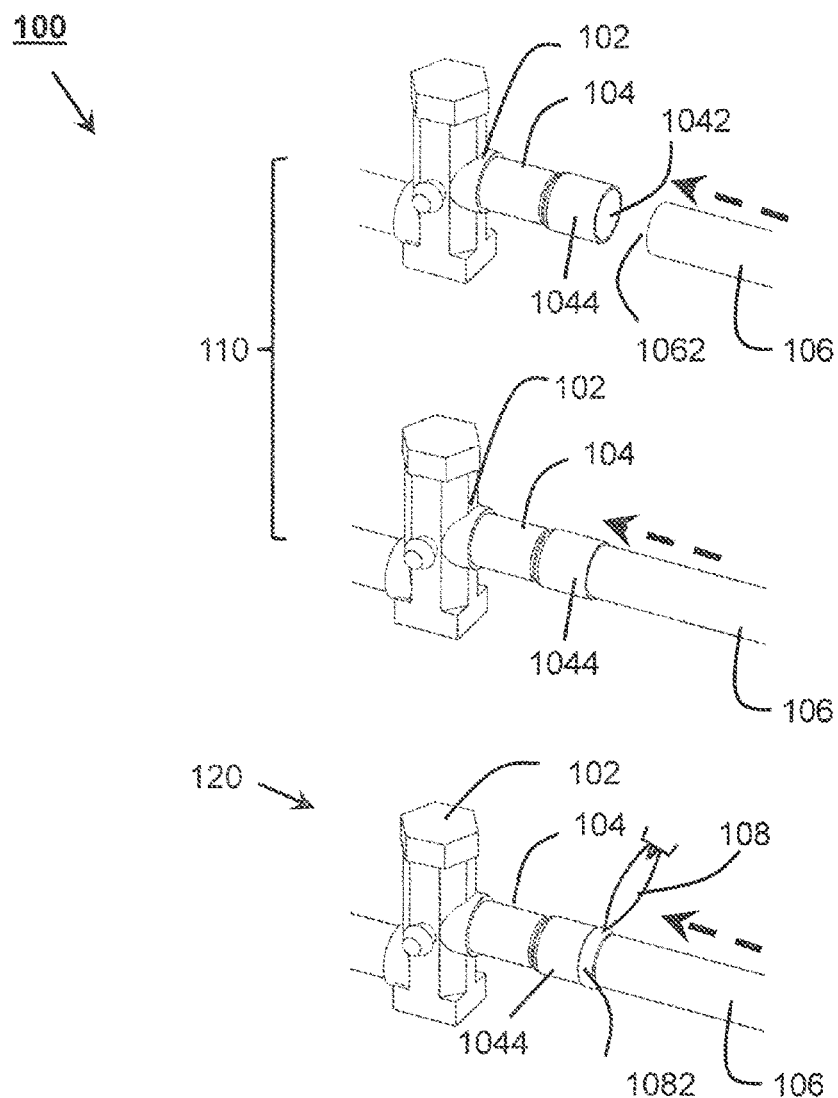
FIG. 1A illustrates a series of visual steps illustrating a method of connecting a fitting body with a pipe according to a prior art.
Figure 1B:
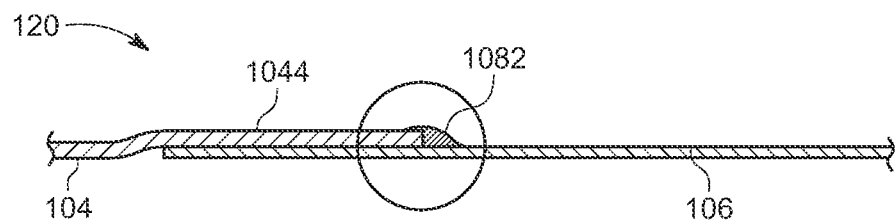
FIG. 1B illustrates a welded joint in a sectional view of a tubular arm of fitting body and the tube according to a prior art.

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claim.

The following definitions are provided as general definitions and should in no way limit the scope of the present disclosure to those terms alone, but are put forth for a better understanding of the following description.

Unless defined otherwise, all technical and scientific terms used herein have the same meaning as commonly understood by those of ordinary skill in the art to which the disclosure belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present disclosure, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present disclosure, the following terms are defined below.

In the context of the present disclosure, a "polymer material" is any naturally occurring or man-made material having long chains of organic molecules (eight or more organic molecules), with physical and chemical properties of such organic molecules giving the material its desired properties.

In the context of the present disclosure, a "tube" is a hollow conduit. The tube may be made up of, but not limited to, any suitable metallic material, polymer material or a composite material. Further, the tube may have a substantially circular cross-section.

In the context of the present disclosure, "temporary fastening" may be achieved by using any of the easily removable or replaceable fasteners such as, but not limited to, screws, bolts, clips, snaps and hooks etc.

In the context of the present disclosure, "secure fastening" may be achieved using fasteners which are relatively difficult to replace such as rivets or adhesives etc.

In the context of the specification, a "fitting body" is a hollow body member made up of metal, polymer material or a composite material. The fitting may have fastening arrangements such as threads at its open ends. Fastening arrangements allow the fitting body to act as an interface while connecting a tube to another component, such as a service valve, another tube or the like.

In the context of the present disclosure, a "ferrule" is adapted to be provided coaxially at an outer tube surface of a tube. According to an embodiment, the ferrule may have a substantially conical shape and/or a substantially conical portion. Under compression, the ferrule may engage with the outer tube surface to provide a leak-proof seal between the tube and the fitting body when the tube is joined with the fitting body, according to embodiments of the present disclosure.

In the context of the present disclosure, a "compression nut" is a nut with an inner diameter being slightly greater than largest diameter of the ferrule. The compression nut is provided with threads on inner surface of the compression nut. The threads allow the nut to be fastened to the fitting body in order to compress the ferrule(s) for providing a leak proof assembly between the tube and the fitting body.

In the context of the specification, "plumbing connection" means a connection of multiple tubes coaxially in series for the purpose of extending the overall length of a supply line, or a connection of a tube with a fitting body that is often required in plumbing applications.

In the context of the specification, a "collet" is a band made up of a plurality of segments extending out of an open end. The collet has a substantially cylindrical inner surface and may have a conical outer surface. The collet may be metallic, plastic, or made up of an elastic material. When pressure is applied to the outer surface of the collet, the plurality of segments contract to grip the outer flexible tube surface of the flexible tube, whereas when the pressure is released, the plurality of segments retain substantially their original shapes, thereby releasing the outer flexible tube surface.

As used throughout this description, the word "may" is used in a permissive sense (i.e. meaning having the potential to), rather than the mandatory sense, (i.e. meaning must). Further, the words "a" or "an" mean "at least one" and the word "plurality" means "two or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

The present disclosure is described hereinafter by various embodiments with reference to the accompanying drawings, wherein reference numerals used in the accompanying drawing correspond to the like elements throughout the description. This disclosure may, however, be embodied in many different forms and should not be construed as limited to the embodiment set forth herein. Rather, the described embodiments are provided so that this disclosure will be thorough and complete and will fully convey the scope of the disclosure to those skilled in the art. In the following detailed description, numeric values and ranges may be provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the disclosure against other materials that may serve the same purpose.

Figure 2A:
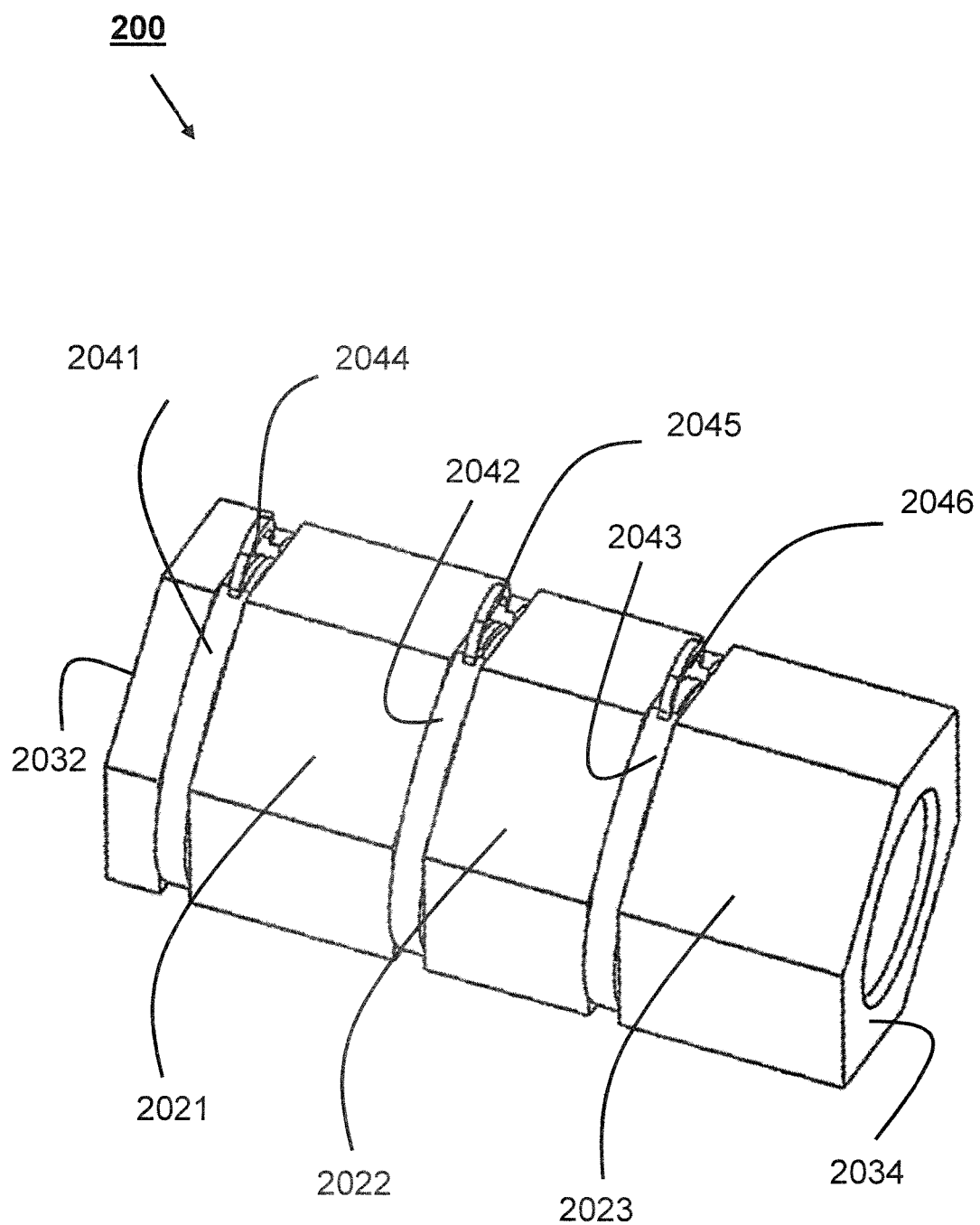
FIG. 2A illustrates a device for making plumbing connections, in accordance with an embodiment of the present disclosure.

Referring to the drawings, the disclosure will now be described in more detail. FIG. 2A illustrates a device 200 for making plumbing connections, in accordance with an embodiment of the present disclosure. The device 200 includes an end portion 2020, a first compression nut 2021, a sleeve fitting body 2022 and a second compression nut 2023 connected axially at a predetermined distance (leaving gaps in between) from each other. According to an embodiment, a first retaining ring 2041, a second retaining ring 2042 and a third retaining ring 2043 are optional features that may be provided in the gaps. The end portion 2020 is similar to the end portion 705 in FIG. 7. In some embodiments (such as illustrated in FIGS. 6A-6C and FIGS. 8A-8C), the first compression nut 2021 also serves as the end portion. The retaining rings 2041-2043 are designed to maintain a gap between each of the end portion 2020, compression nut 2021, sleeve fitting body 2022 and second compression nut 2023 to allow the device to freely move along the tube 106 while retaining the gaps caused by the retaining rings 2041-2043. The first retaining ring 2041, second retaining ring 2042 and the third retaining ring 2043 may be made of, but not limited to, plastic material. The first compression nut 2021, the sleeve fitting body 2022 and the second compression nut 2023 have to be disengaged before any of the first compression nut 2021, the sleeve fitting body 2022 and the second compression nut 2023 is tightened. Each of the first retaining ring 2041, the second retaining ring 2042 and the third retaining ring 2043 has a substantially circular profile having respective cut portions on top. The cut portion is connected by respective elements 2044, 2045, 2046 of the same material of as that of the retaining rings and having substantially semi-circular profile. It is noted that the first retaining ring 2041, second retaining ring 2042, and third retaining ring 2043 are discarded when the device 200 is in use.

Figure 2B:
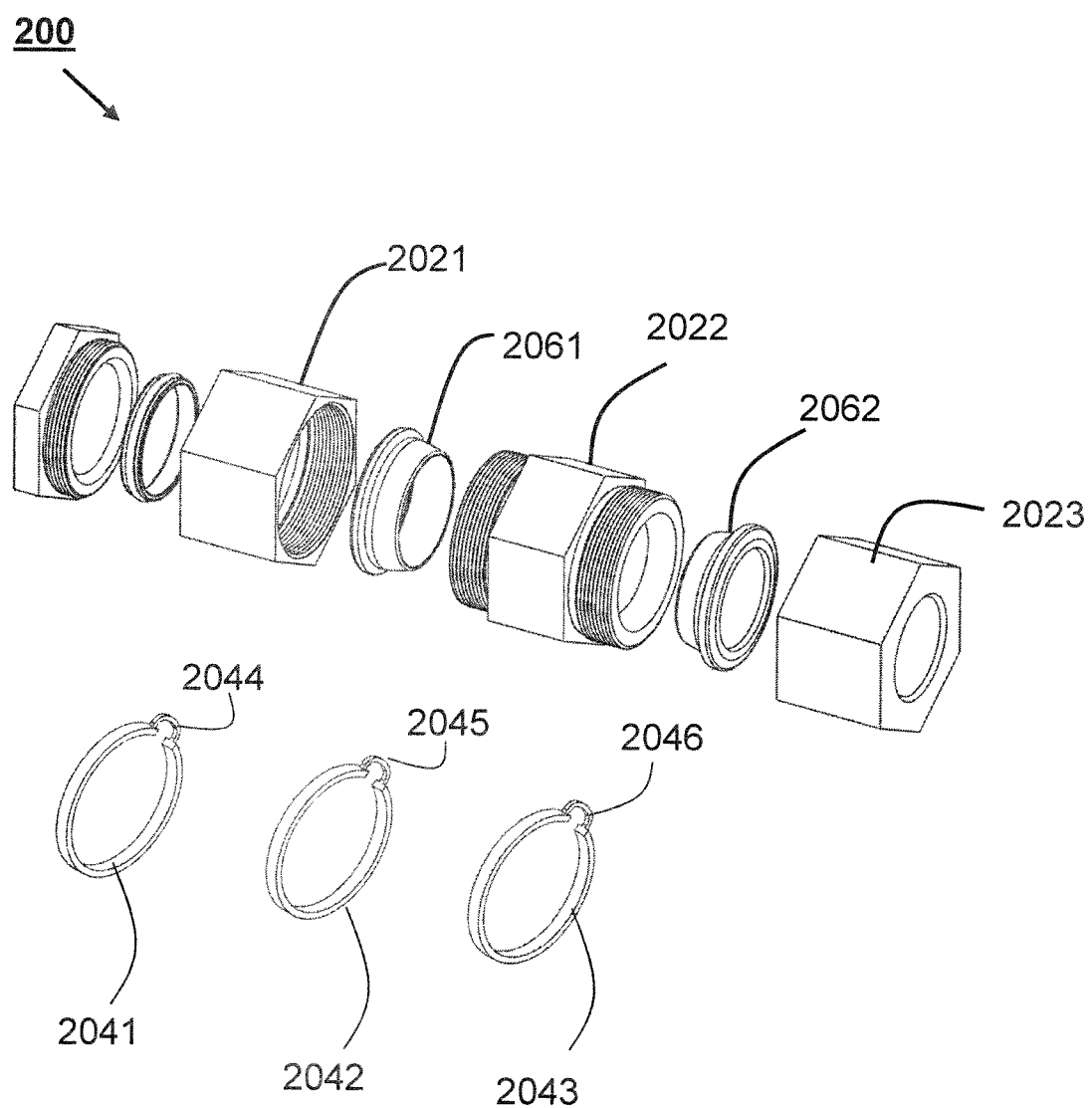
FIG. 2B illustrates an exploded view of the device of FIG. 2A, in accordance with an embodiment of the present disclosure.

FIG. 2B illustrates an exploded view of the device 200 of FIG. 2A, in accordance with an embodiment of the present disclosure. As shown in FIG. 2B, there is a pair of ferrules: a first ferrule 2061 provided coaxially and enclosed between the first compression nut 2021 and sleeve fitting body 2022, and a second ferrule 2062 provided coaxially and enclosed between the sleeve fitting body 2022 and the second compression nut 2023. According to an embodiment, the device 200 may be manufactured integrally so as to enable the compression nuts to be tightened sequentially. Further, integrating components of the device 200 may prevent any loss of parts and erroneous assembly that may occur if the device 200 had to be assembled using individual components (compression nuts, ferrules, rings). Moreover, integrally manufacturing device 200 would also allow the constant interval to be maintained, thereby protecting the internal parts such as the ferrules from damaging when compression nuts are rotated.

Figure 3A:
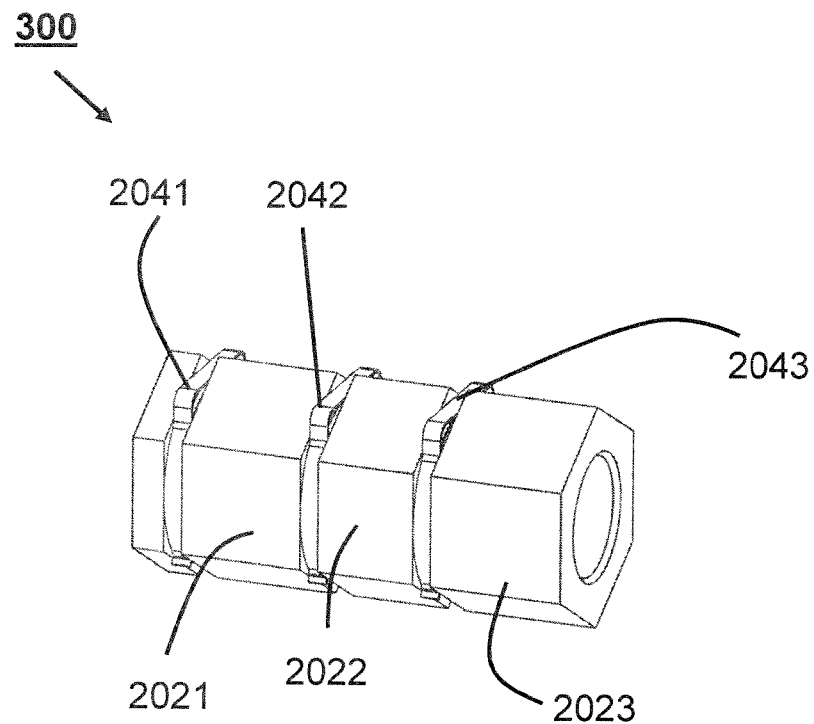
FIG. 3A illustrates a device for making plumbing connections, in accordance with another embodiment of the present disclosure.
Figure 3B:
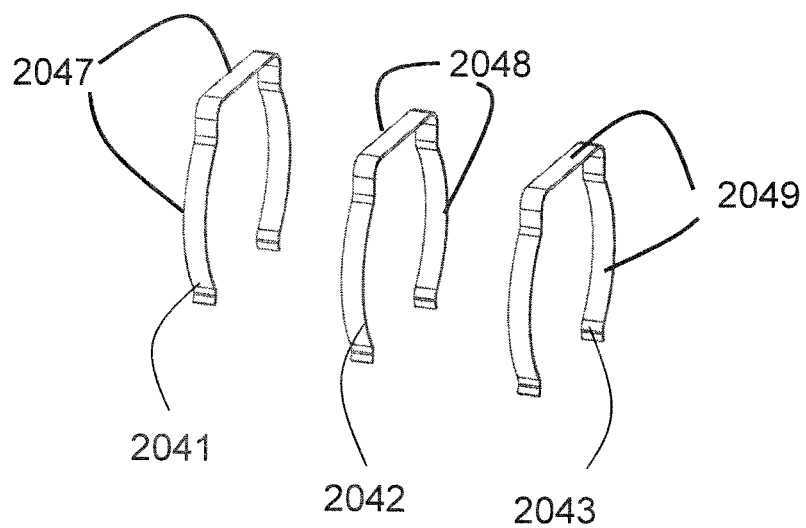
FIG. 3B illustrates an exploded view of the device of FIG. 3A, in accordance with an embodiment of the present disclosure.

In another embodiment 300 shown in FIG. 3A and FIG. 3B, each of the first retaining ring 2041, the second retaining ring 2042 and the third retaining ring 2043 have a profile that includes multiple circular & flat portions 2047, 2048, 2049 and an open portion.

Figure 4:
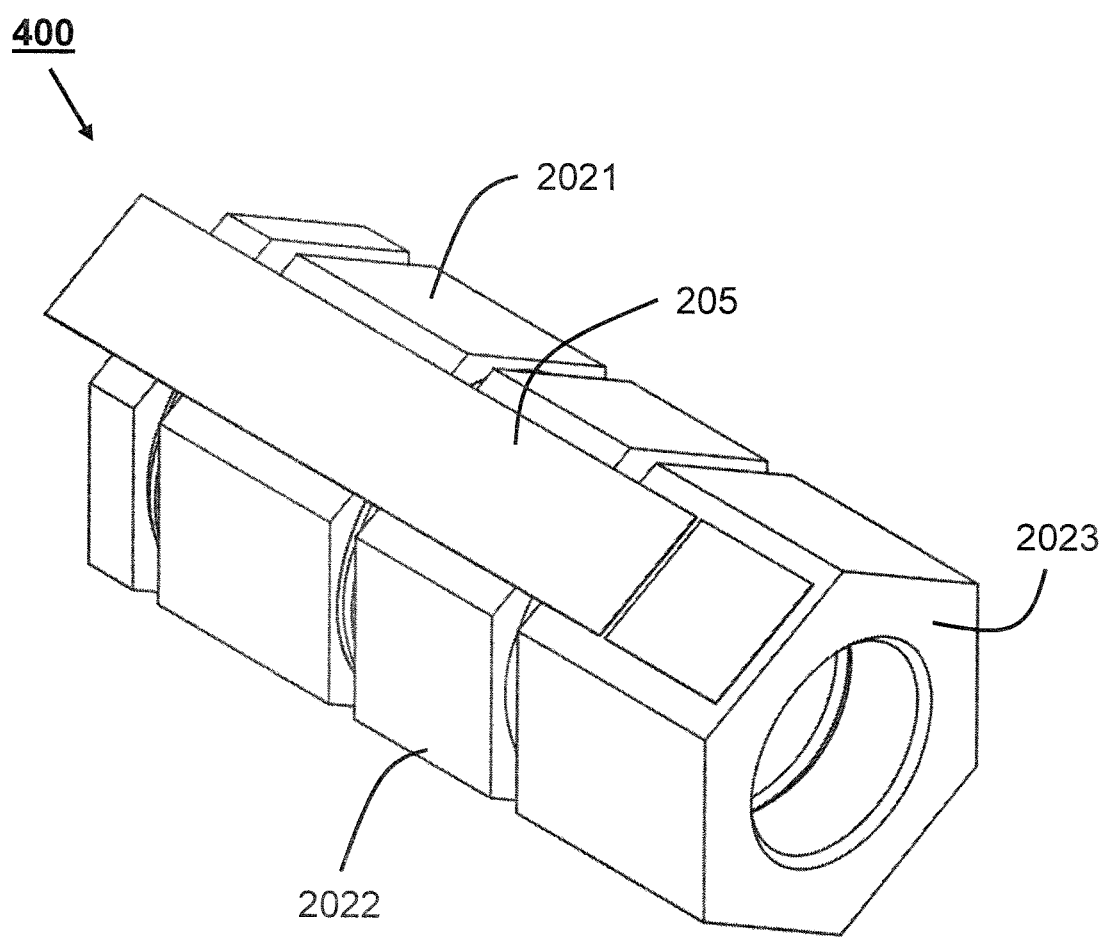
FIG. 4 illustrates a device for making plumbing connections, in accordance with an embodiment of the present disclosure.

In yet another embodiment 400 shown in FIG. 4, instead of the first retaining ring 2041, the second retaining ring 2042 and the third retaining ring 2043, a non-adhesive tape 205 may be used that does not leave glue on the device 400 when removed. The spacing between the first compression nut 2021, sleeve fitting body 2022 and a second compression nut 2023 may be retained by the depths of respective threaded portions (not shown in FIG. 4), and the tape may prevent rotation (when device 200 is not in use). Also, the tape 205 may be comprise two parts. One part may be removable (during installation) and the other non-removable. The non-removable part may be used to include information about the device 400 and the manufacturer.

Figure 5A:
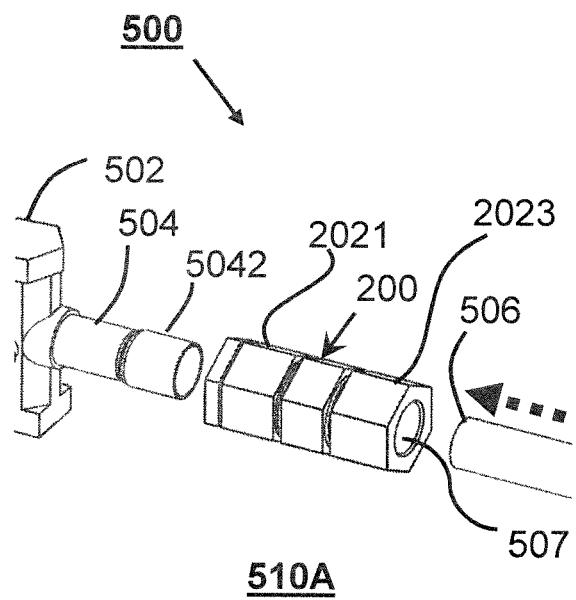
FIG. 5A-5B illustrate a series of visual steps of a method of using the device for making plumbing connections, in accordance with an embodiment of the present disclosure.
Figure 5A:
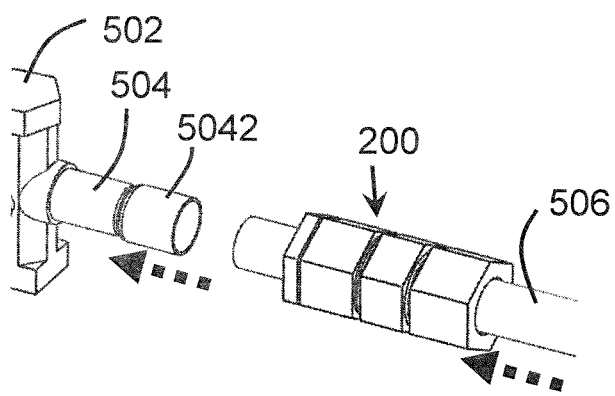
Figure 5B:
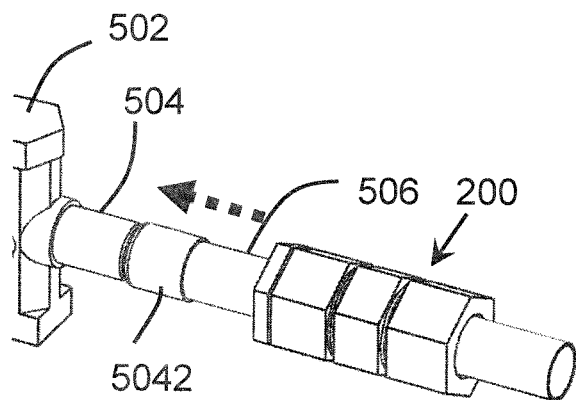
Figure 5B:
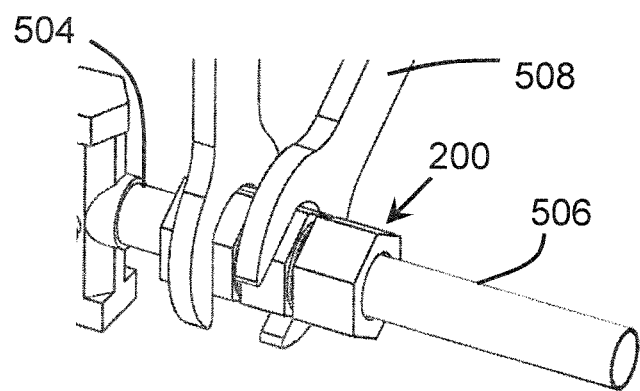
Figure 5B:
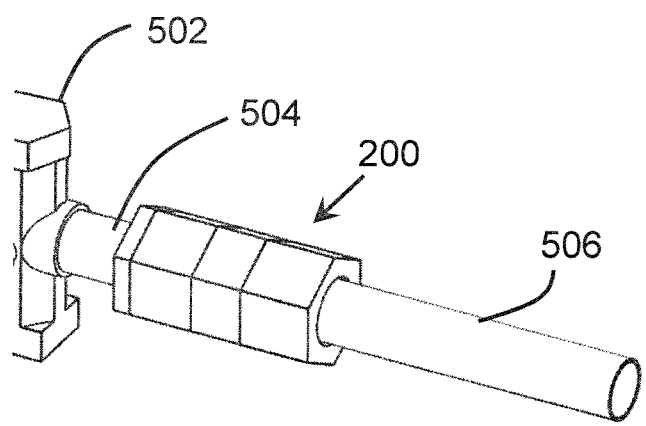

FIGS. 5A and 5B illustrate a series of visual steps of a process of using the device 200 for making plumbing connections, in accordance with an embodiment of the present disclosure. The device 200 is used to connect the tube (or pipe) 506 in series with a fitting body 502. The pair of ferrules (not shown) in the device 200 provide leak proof metal-to-metal assembly between the tube 506 and the fitting body 502, while the first compression nut 2021, the sleeve fitting body 2022 and the second compression nut 2023 serve the purpose of applying pressure to the ferrules to keep the device in place.

The process 500 begins at step 510A and 510B, at which the tube 506 is passed through the device 200 (through the cavity 507). Then at step 520, one end of the tube 506 is inserted into the fitting body 502. The fitting body 502 has a tubular arm 504 that further includes a widened portion 5042, of a predetermined depth, to receive the tube 506. The tubular arm 504 is contemplated to include a step-structure because of presence of the widened portion 5042. The widened portion 5042 extends the tubular arm 504 at a predetermined depth in order to arrest the insertion of the tube 506 beyond the predetermined depth. In that manner, an internal diameter of the tubular arm 504 beyond the predetermined depth of the widened portion 5042 would be smaller than an external diameter of the tube 506. Once the tube 506 is inserted to the predetermined depth, the tube 506 cannot be inserted further.

At step 530, the device 200 (which is in a loosened state) is slid towards the joint of the tubular arm 504 of the fitting body 502 and the tube 506 (i.e. the step point where the widened portion 5042 begins on the tubular arm 504), and each of the first compression nut 2021 and the second compression nut 2023 may be fastened sequentially to the sleeve fitting body 2022 using one or more wrenches 508. Fastening of the first compression nut 2021 to the sleeve fitting body 2022 causes the first ferrule 2061 to compress against the widened portion 5042 of the tubular arm 504, and fastening the second compression nut 2023 to the sleeve fitting body 2022 causes the ferrule 2062 to compress against the tube 506, thereby affixing the device 200 (and the tube 506) to the fitting body 502 and forming a leak-proof sealing. It is noted that in FIG. 5A, the first compression nut 2021 is illustrated as comprising two elements (this embodiment will be described later). However, according to an embodiment, the first compression nut 2021 may be a single element.

At step 540, the one or more wrenches 508 are removed, and the secure connection is completed.

Figure 6A:
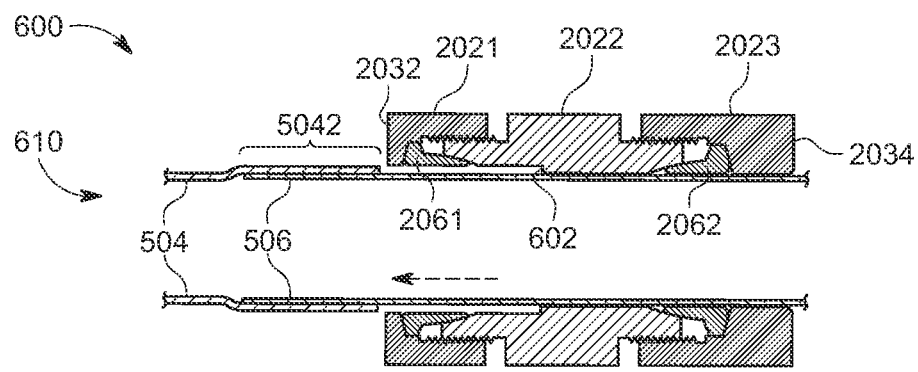
FIGS. 6A-6C illustrate a series of visual steps for making plumbing connections using the device, in accordance with an embodiment of the present disclosure.
Figure 6B:
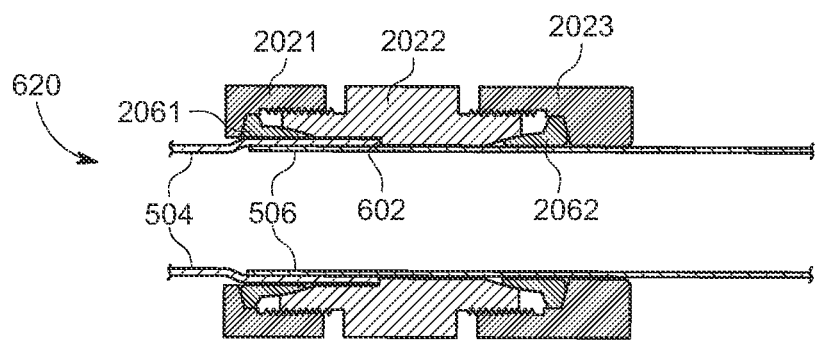
Figure 6C:
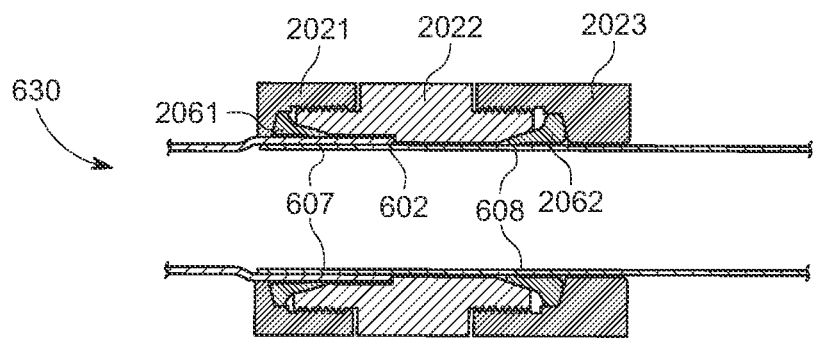

FIGS. 6A-6C illustrate a process for making plumbing connections using the device 200, in accordance with an embodiment of the present disclosure. It is to be noted here, that the first end 2032 is oriented facing toward the fitting body 502 (not illustrated) and the second end 2034 is oriented facing away from the fitting body 502. At step 610 (FIG. 6A), the tube 506 is inserted into the tubular arm 504 of the fitting body 502 (not shown). As can be seen from the sectional views illustrated in FIG. 6A-6C, the sleeve fitting body 2022 includes a step portion 602 on an internal surface of the cavity of the sleeve fitting body 2022. The step portion 602 is located at a predetermined depth from the end of a threaded portion of the sleeve fitting body 2022. The internal diameters of the narrowest portions of the first compression nut 2021, the first ferrule 2061 and the sleeve fitting body 2022 (up to the step portion 602) are each similar to or greater than the outer diameter of the widened portion 5042 of the tubular arm 504. Further, the internal diameters of the narrowest portions of the sleeve fitting body 2022 (from the step portion 602 to the end of the sleeve fitting body 2022 facing away from the fitting body 502), the second ferrule 2062 and the second compression nut 2023 are each smaller than the outer diameter of the widened portion 5042 and similar to or greater than the outer diameter of the tube 506. As can be seen in FIGS. 6A-6C, the internal wall of the cavity at each end of the sleeve fitting body 2022 is flared to allow engagement with the angled portion of a corresponding ferrule 2061/2062. The step portion 602 prevents the widened portion 5042 of the tubular arm 504 to be inserted further beyond the predetermined depth (and likewise prevents the device 200 from being further slid toward the fitting body 502). According to an embodiment, the predetermined depth of the step portion 602 is set such that, when the first compression nut 2021 is fully fastened to the sleeve fitting body 2022, the distance from the first end 2032 of the device 200 to the step portion 602 substantially coincides with the length of the widened portion 5042.

At step 620 (FIG. 613), the device 200 (which is in a loosened state) is slid towards the tubular arm 504 such that the step portion 602 abuts the open end of the widened portion 5042 of the tubular arm 504. At this time, the device 200 may not be further slid toward the fitting body 502.

At step 630 (FIG. 6C), the first compression nut 2021 and the second compression nut 2023 may each be fastened to apply pressure on the first ferrule and the second ferrule 2062, respectively. The first ferrule 2061 in turn applies pressure on an outer surface of the tubular arm 504 and forms a first dent 607 in an inward direction, and the second ferrule 2062 in turn applies pressure on an outer surface of the tube 506 and forms a second dent 608 in an inward direction. The indenting ensures that the device 200, and thereby the joint of the tubular arm 504 and the tube 506, are fixed and immovable and the secure connection is formed and leak-proof.

FIGS. 7A-7E illustrate a process for making plumbing connections using the device 200, in accordance with another embodiment of the present disclosure. According to an embodiment, the first compression nut 2021 comprises two parts, an end portion 705 (illustrated as end portion 2020 in FIGS. 2A-S) and an engaging portion 706. The end portion is disposed at the first end 2032 and has a threaded portion that engages with the corresponding threaded portion of the engaging portion 706, which has the threaded portion of the first compression nut 2021 that is used to fasten to the sleeve fitting body 2022. According to an embodiment, the inner diameters of the end portion 705 and the engaging portion 706 are the same. According to an embodiment, the device 200 further includes a rubber ring 702 below the first compression nut 2021 between the end portion 705 and the engaging portion 706. At step 710 (FIG. 7A), the tube 506 is inserted into the tubular arm 504 of the fitting body (not shown). At step 720 (FIG. 7B), the device 200 (which is in a loosened state) is slid towards the joint of the tube 506 and the tubular arm 504 such that the step portion 602 abuts the widened portion 5042 of the tubular arm 504. At this instance, the device 200 may not be further slid toward the fitting body 502 (not illustrated). At step 730 (FIG. 7C), the end portion 705 of the first compression nut 2021 is fastened to the engaging portion 706 to apply pressure on the rubber ring 702, thereby causing rubber ring 702 to be pushed toward the outer surface of the tubular arm 504. The device 200 is then slid in a direction away from the fitting body 502 until the rubber ring abuts the joint (i.e. the step point where the tubular arm 504 becomes the widened portion 5042).

At step 740 (FIG. 7D), the rubber ring 702 conforms to the joint of the tubular arm 504, the joint having a slanted step-structure at the external surface of the tubular arm 502, where an external diameter of the tubular arm 504 changes. At step 750 (FIG. 7E), the sleeve fitting body 2022 is fastened to the engaging portion 706 of the first compression nut 2021 to apply pressure on the first ferrule 2061, and the second compression nut 2023 may be fastened to the sleeve fitting body 2022 to apply pressure on the second ferrule 2062.

Figure 7A:
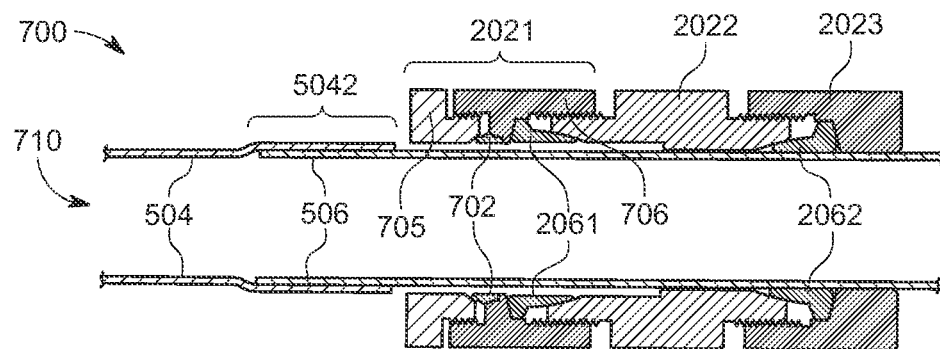
FIGS. 7A-7E illustrate a series of visual steps for making plumbing connections using the device, in accordance with another embodiment of the present disclosure.
Figure 7B:
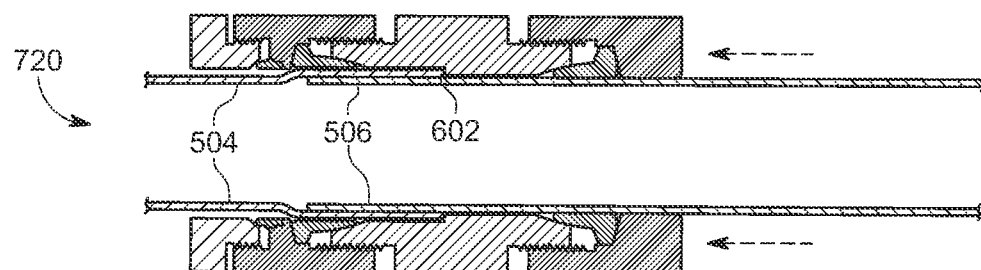
Figure 7C:
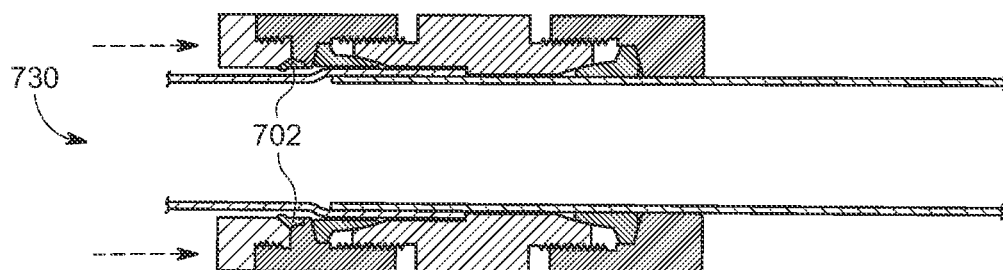
Figure 7D:
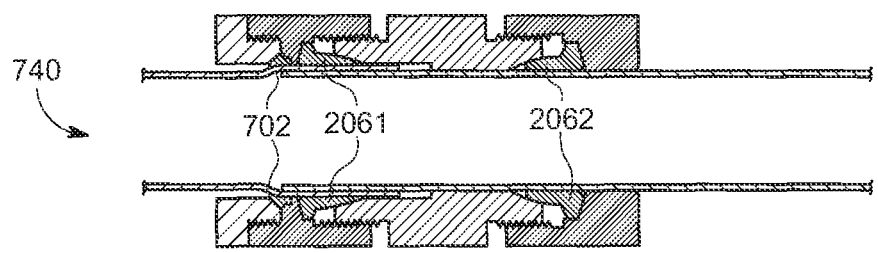
Figure 7E:
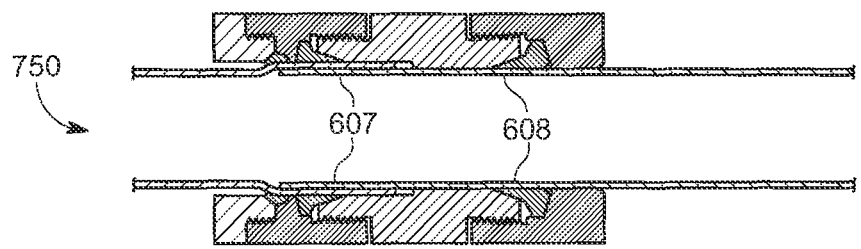

It is noted that fastening the sleeve fitting body 2022 to the engaging portion 706 will cause the sleeve fitting body 2022 to move toward the fitting body 502 as the rubber ring 702 prevents the first compression nut 2021 from moving toward the sleeve fitting body 2022. As can be seen in FIGS. 7D-7E, the gap between the step portion 602 of the sleeve fitting body 2022 and the open end of the widened portion 5042 is decreased between step 740 and 750. This movement is what causes the downward pressure on the first ferrule 2061.

Similarly, fastening the second compression nut 2023 to move toward the sleeve fitting body 202, causing downward pressure on the second ferrule 2062. The first ferrule 2061 in turn applies pressure on widened portion 5042 of the tubular arm 504 to form the first dent 607, and the second ferrule 2062 applies pressure on the tube 506 to form the second dent 608 in an inward direction. The indenting ensures that the device 200 and thereby the joint of the tubular arm 504 and the tube 506 are fixed and immovable and the secure connection is formed and leak-proof.

According to an embodiment, the predetermined depth of the step portion 602 from the end of a threaded portion of the sleeve fitting body 2022 facing the tubular arm 504 is set such that the length of the widened portion 5042 coincides with a distance from the step portion 602 of the sleeve fitting body 2022 to the gap between the end portion 705 and the engaging portion 706 of the first compression nut 2021 in a closed state (i.e. when the end portion 705 is fully fastened to the engaging portion 706 and the sleeve fitting body 2022 is fully fastened to the engaging portion 706 of the first compression nut 2021).

Figure 8A:
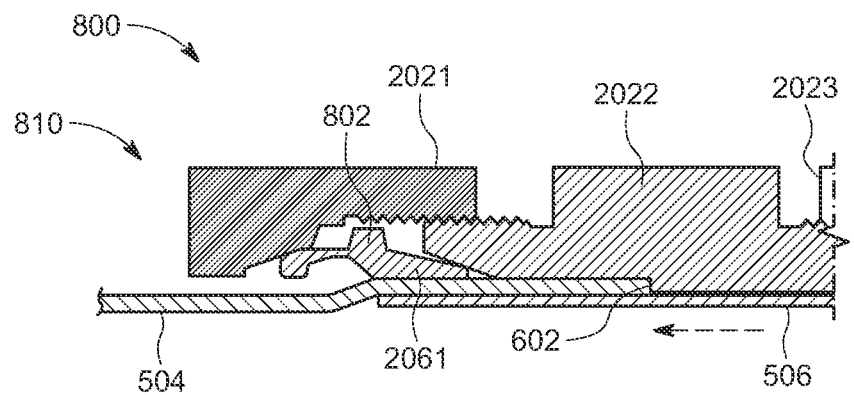
FIGS. 8A-8C illustrate a series of visual steps for making plumbing connections using the device, in accordance with another embodiment of the present disclosure.
Figure 8B:
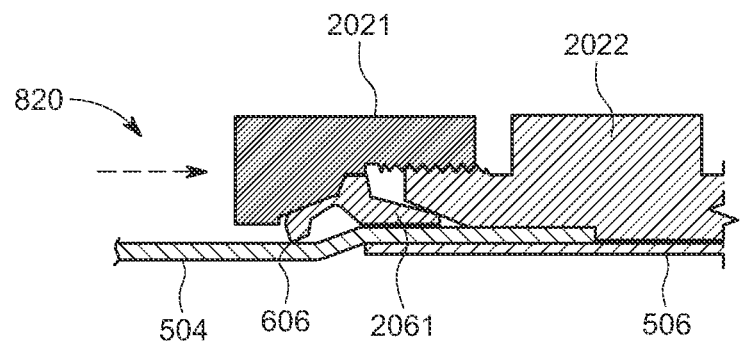
Figure 8C:
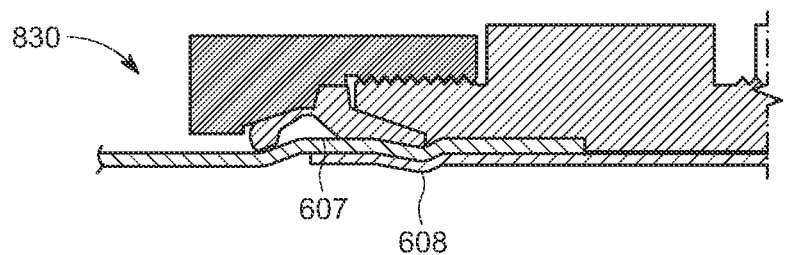
Figure 8D:
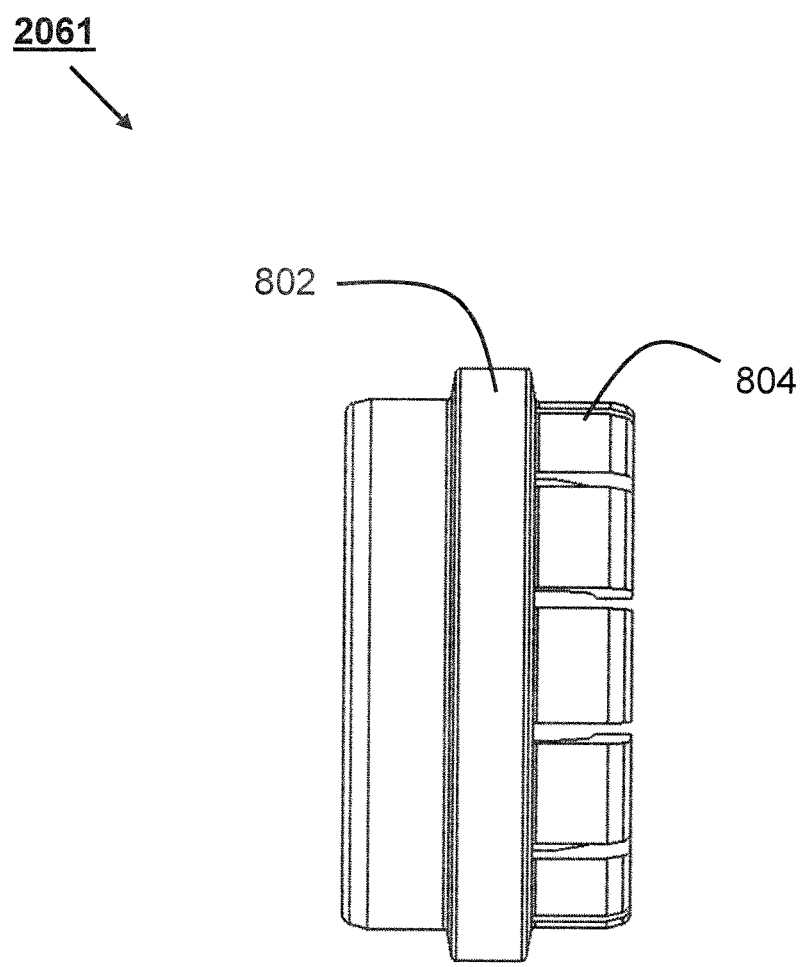
FIG. 8D illustrates a collet of FIGS. 8A-8C, in accordance with an embodiment of the present disclosure.

FIGS. 8A-8C illustrate a series of visual steps for making plumbing connections using the device 200, in accordance with another embodiment of the present disclosure. FIGS. 8A-8) illustrate an alternative embodiment to FIGS. 7A-7E, such that the rubber ring 702 is replaced with a collet 802, an embodiment of which is illustrated in FIG. 8D. The collet 802 is provided in series with the first ferrule 2061 such that the segmented end portion 804 of the collet 802 faces the fitting body 502 (not illustrated). According to an embodiment a single combination ferrule that includes the first ferrule 2061 and the collet 802 may be used.

At step 810 (FIG. 8A), after the tube 506 has been inserted into the widened portion 5042 of the tubular arm 504 of the fitting body 502 (not shown), the device 200 is slid towards the joint of the tube 506 and the tubular arm 504 such that the step portion 602 abuts the open end of the widened portion 5042 of the tubular arm 504. At this instance, the device 200 may not be further slid toward the fitting body 502. At step 820 (FIG. 8B), the first compression nut 2021 is fastened to apply pressure on the segmented end portion 804 of the collet 802. The pressure compresses the segmented end portion 804 to contact the external surface of the tubular arm 504 as the first compression nut 2021 is being fastened and moves toward the sleeve fitting body 2022. The sleeve fitting body 2022 may be held in place using a tool like a wrench and such.

At step 830 (FIG. 8C), as the first compression nut 2021 is fastened to the sleeve fitting body 2022, a downward pressure from an angled portion in the interior surface of the first compression causes the segmented end portion 804 of the first ferrule 2061 to conform to the slanted portion of the joint, where the widened portion 5042 begins on the tubular arm 504. In addition, the sleeve fitting body 2022 applies pressure on the first ferrule 2061, causing the first ferrule 2061 to apply pressure on an outer surface of the widened portion 5042 of the tubular arm 504 and form the first dent 607. Although not illustrated, fastening the second compression nut 2023 causes a downward force on the second ferrule 2062 to apply pressure on an outer surface of the tube 506 and form the second dent 608 as previously described with regard to FIGS. 6C and 7E. The indenting ensures that the device 200 and thereby the joint of the tubular arm 504 and the tube 506 are fixed and immovable. The secure connection is thereby formed preventing any slippage of the connecting parts or any leakage in the tube 506.

FIGS. 9A-9E illustrate a series of visual steps for making connections using a socket-style sleeve fitting body, in accordance with an embodiment of the present disclosure. A socket-style sleeve fitting body, according to an embodiment, will now be described in detail.

Figure 9A:
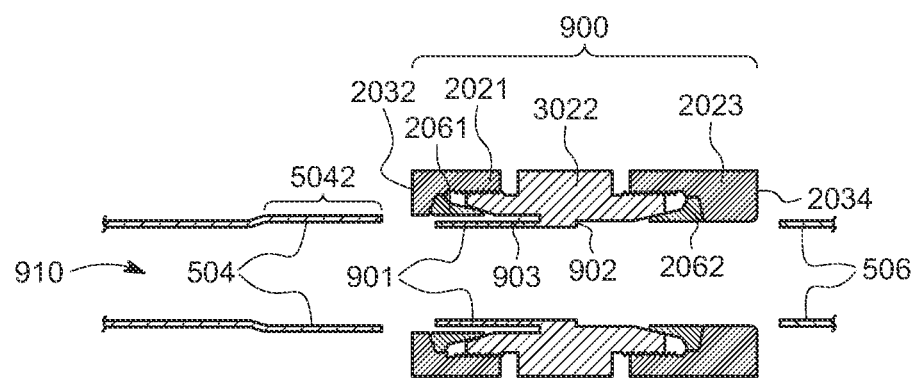
FIG. 9A-9E illustrate a series of visual steps for making connections using a socket-style sleeve fitting body, in accordance with an embodiment of the present disclosure.
Figure 9B:
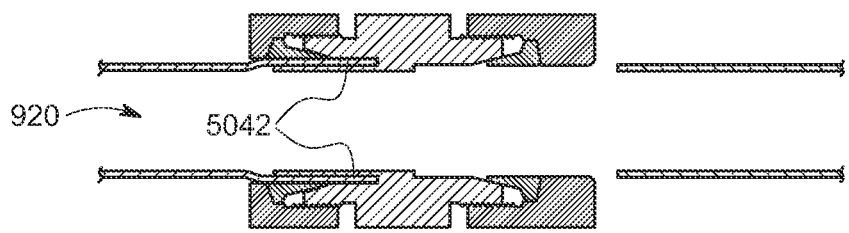
Figure 9C:
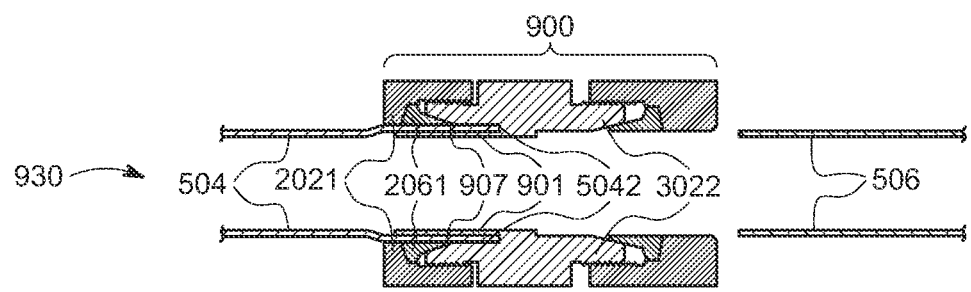
Figure 9D:
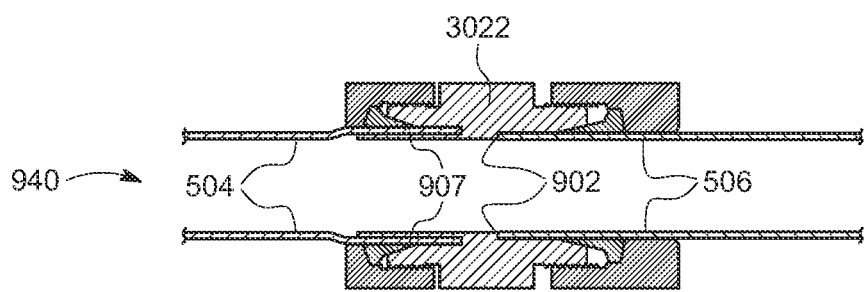
Figure 9E:
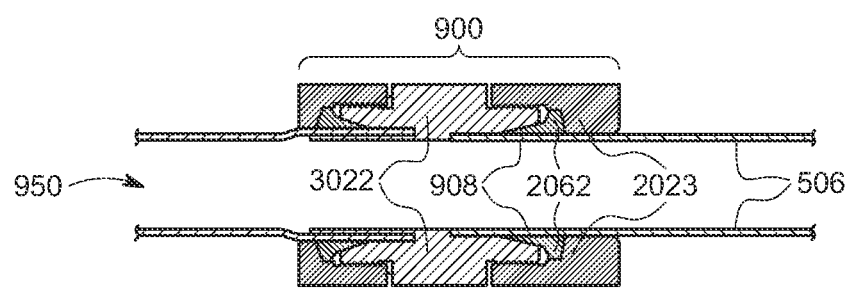
Figure 9F:
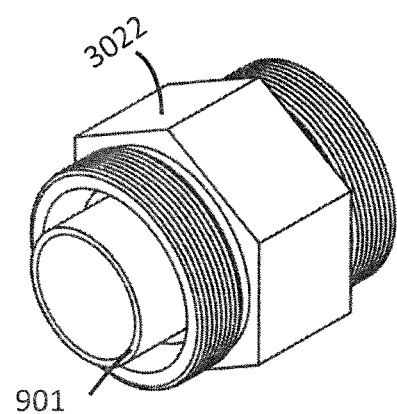
FIG. 9F illustrates a socket-style sleeve fitting body of FIG. 9A, in accordance with an embodiment of the present disclosure.

According to an embodiment, a socket-style sleeve fitting body 3022, an example embodiment of which is illustrated in FIG. 9F, is provided to act as an interface while connecting a tube to another component, such as a service, valve, another tube, or the like. Unlike the embodiments previously described, the socket-style sleeve fitting body 3022 has an inner cylindrical portion 901 extending toward the tubular arm 504 of the fitting body 502 (not illustrated), such that when looking at the cross section of the socket-style sleeve fitting body 3022, the inner cylindrical portion 901 is concentric to the threaded open end of the socket-style sleeve fitting body 3022 that also extends toward the fitting body 502. Also unlike the embodiments previously described, the socket-style sleeve fitting body 3022 does not allow the tube 506 to pass through the device 900, which is the device 200 with socket-style sleeve fitting body 3022 replacing the sleeve fitting body 2022. According to an embodiment, the inner cylindrical portion 901 extends out further than the threaded open end of the socket-style sleeve fitting body 3022, as illustrated in FIGS. 9A-9F.

At step 910 (FIG. 9A), the tubular arm 504, the device 200 (with socket-style sleeve fitting body 3022 instead of sleeve fitting body 2022), and the tube 506 are all disengaged from each other. The device 200 is also in a loosened state. Similar to the embodiments already disclosed, the first end 2032 is oriented facing toward the fitting body 502 (not illustrated), and the second end 2034 is oriented facing away from the fitting body 502. The device 200 is constructed in a loosened state similar to step 510A of FIG. 5A and prior to step 610 of FIG. 6A.

At step 920 (FIG. 9B), the widened portion 5042 of the tubular arm 504 is engaged with the open end of the socket-style sleeve fitting body 3022 that has the inner cylindrical portion 901 such that the wall of the widened portion 5042 of the tubular arm 504 is inserted between the threaded open end of the socket-style sleeve fitting body 3022 facing the tubular arm 504 and the inner cylindrical portion 901. According to an embodiment, the widened portion 5042 is inserted until it reaches the deep end of the gap 903. The narrowest portion of the gap 903 between the inner cylindrical portion 901 and the inner wall of the threaded open end of the socket-style sleeve fitting body 3022 has a width that is set to snugly accommodate the widened portion 5042 of the tubular arm 504, as illustrated in FIG. 9B.

As can be seen from the sectional views illustrated in FIG. 9B-9E, the socket-style sleeve fitting body 3022 includes a step portion 902 on an internal surface of the cavity of the socket-style sleeve fitting body 3022. The step portion 902 is located at a depth between the deep end of the gap 903 (i.e. the farthest point at which the widened portion 5042 may be inserted into the gap 903) and the flared portion of the socket-style sleeve fitting body 3022 that faces away from the tubular arm 504. The internal diameters of the narrowest portions of the first compression nut 2021 (at the first end 2032), the first ferrule 2061 and the threaded portion of the socket-style sleeve fitting body 3022 facing the tubular arm 504 (up to the step portion 902) are each similar to or greater than the outer diameter of the widened portion 5042 of the tubular arm 504. The outer diameter of the inner cylindrical portion 901 of the socket-style sleeve fitting body 3022 is similar to or less than the internal diameter of the widened portion 5042 of the tubular arm 504 to allow close or snug fitting for the widened portion 5042 of the tubular arm 504. Further, the internal diameters of the narrowest portions of the sleeve fitting body 2022 (from the step portion 602 to the end of the sleeve fitting body 2022 facing away from the fitting body 502), the second ferrule 2062 and the second compression nut 2023 are each smaller than the outer diameter of the widened portion 5042 and similar to or greater than the outer diameter of the tube 506. As can be seen in FIGS. 9A-9E, the internal wall of the cavity at each end of the socket-style sleeve fitting body 3022 is flared to allow engagement with the angled portion of a corresponding ferrule 2061/2062. The step portion 902 prevents the tube 506 from being inserted further beyond the predetermined depth, and likewise prevents the device 200 from being further slid toward or away from the fitting body 502. According to an embodiment length of the cylindrical portion 901 (i.e. the distance from the end of the cylindrical portion 901 facing the tubular arm 504 to the deep end of the gap 903 is set based on the length of the widened portion 5042. According to an embodiment, the length of the cylindrical portion 901 may be set such that, when the first compression nut 2021 is fully fastened to the socket-style sleeve fitting body 3022, the distance from the first end 2032 of the device 900 to the deep end of the gap 903 substantially coincides with the length of the widened portion 5042.

At step 930 (FIG. 9C), the first compression nut 2021 is fastened to apply pressure on the first ferrule 2061. The first ferrule 2061 in turn applies pressure on an outer surface of the tubular arm 504 (may be on the widened portion 5042) and forms a first dent 907 in an inward direction. The indenting ensures that the device 900, and thereby the joint of the tubular arm 504 and the cylindrical portion 901 of the socket-style sleeve fitting body 3022, are fixed and sealed such that a secure connection is formed and leak-proof.

At step 940, (FIG. 9D), the tube 506 is inserted into the open end of the socket-style sleeve fitting body 3022 that faces away from the tubular arm 504. According to an embodiment, the tube 506 is inserted until the inserted open end of the tube 506 abuts the step portion 902.

At step 950 (FIG. 9E), the inner threaded portion of the second compression nut 2023 is fastened to the corresponding outer threaded portion of the open end of the socket-style sleeve fitting body 3022 (as shown in FIG. 9E) to apply pressure on the second ferrule 2062. The second ferrule 2062 in turn applies pressure on an outer surface of the tube 506 and forms a second dent 908 in an inward direction. The indenting ensures that the joint of the tube 506 and the socket-style sleeve fitting body 3022 of device 900 are fixed and sealed such that a secure connection is formed and leak-proof.

It is noted that steps 920 and 940 do not have to be performed in the illustrated sequence. For example, according to an embodiment, steps 940 and 950 may be performed prior to steps 930 and 940.

The present disclosure provides a number of advantages. For example, embodiments of the disclosure provide a simple, cost-effective and easily implementable solution for joining multiple tubes/pipes or a tube/pipe with a fitting body that saves time and does not require expert supervision or secure environment. This present disclosure ensures leak proof connections without running the risk of damaging the tube.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to hold on to all other such alternatives, modifications, and variations that fall within the scope of the present disclosure and appended claims.

We claim:

1. A connection apparatus comprising:
   a first compression nut comprising a first narrowest portion and a first threaded portion, the first narrowest portion having a first internal cavity with a first diameter;
   a second compression nut comprising a second narrowest portion and a second threaded portion, the second narrowest portion having a second internal cavity with a second diameter narrower than the first diameter;
   a sleeve fitting body between the first compression nut and the second compression nut, the sleeve fitting body comprising:
      a third threaded portion corresponding to the first threaded portion,
      a fourth threaded portion corresponding to the second threaded portion,
      a first cavity portion having the first diameter, and
      a second cavity portion having the second diameter, the second cavity portion being the narrowest internal cavity of the sleeve fitting body, an end of the second cavity portion abutting an end of the first cavity portion at a step portion in the sleeve fitting body;
   a first ferrule between the first compression nut and the sleeve fitting body; and
   a second ferrule between the sleeve fitting body and the second compression nut.

2. The connection apparatus of claim 1, wherein the first compression nut comprises:
   an end portion comprising a fifth threaded portion and a portion of the first narrowest portion; and
   an engaging portion comprising a sixth threaded portion corresponding to the fifth threaded portion and the remaining portion of the first narrowest portion.

3. The connection apparatus of claim 2, further comprising a ring between the end portion and the engaging portion.

* * * * *

UNITED STATES PATENT AND TRADEMARK OFFICE
CERTIFICATE OF CORRECTION

| | |
|---|---|
| PATENT NO. | : 11,396,963 B2 |
| APPLICATION NO. | : 15/979975 |
| DATED | : July 26, 2022 |
| INVENTOR(S) | : Brian B. Kim |

It is certified that error appears in the above-identified patent and that said Letters Patent is hereby corrected as shown below:

On the Title Page

Item (73) Assignee, Please change "Brian B. Scott" to --Brian B. Kim--.

Signed and Sealed this
Nineteenth Day of December, 2023

Katherine Kelly Vidal
*Director of the United States Patent and Trademark Office*